UNITED STATES PATENT OFFICE.

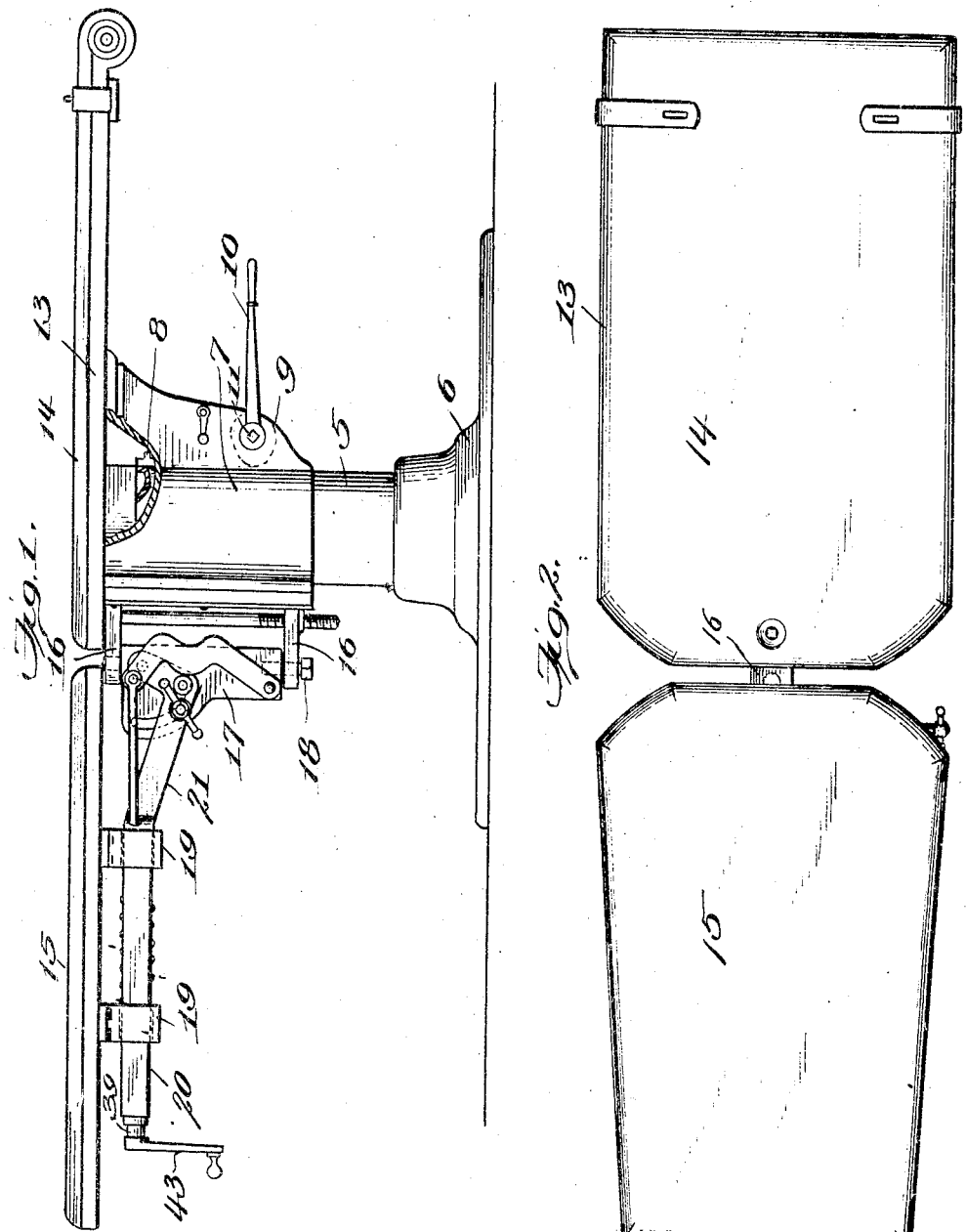

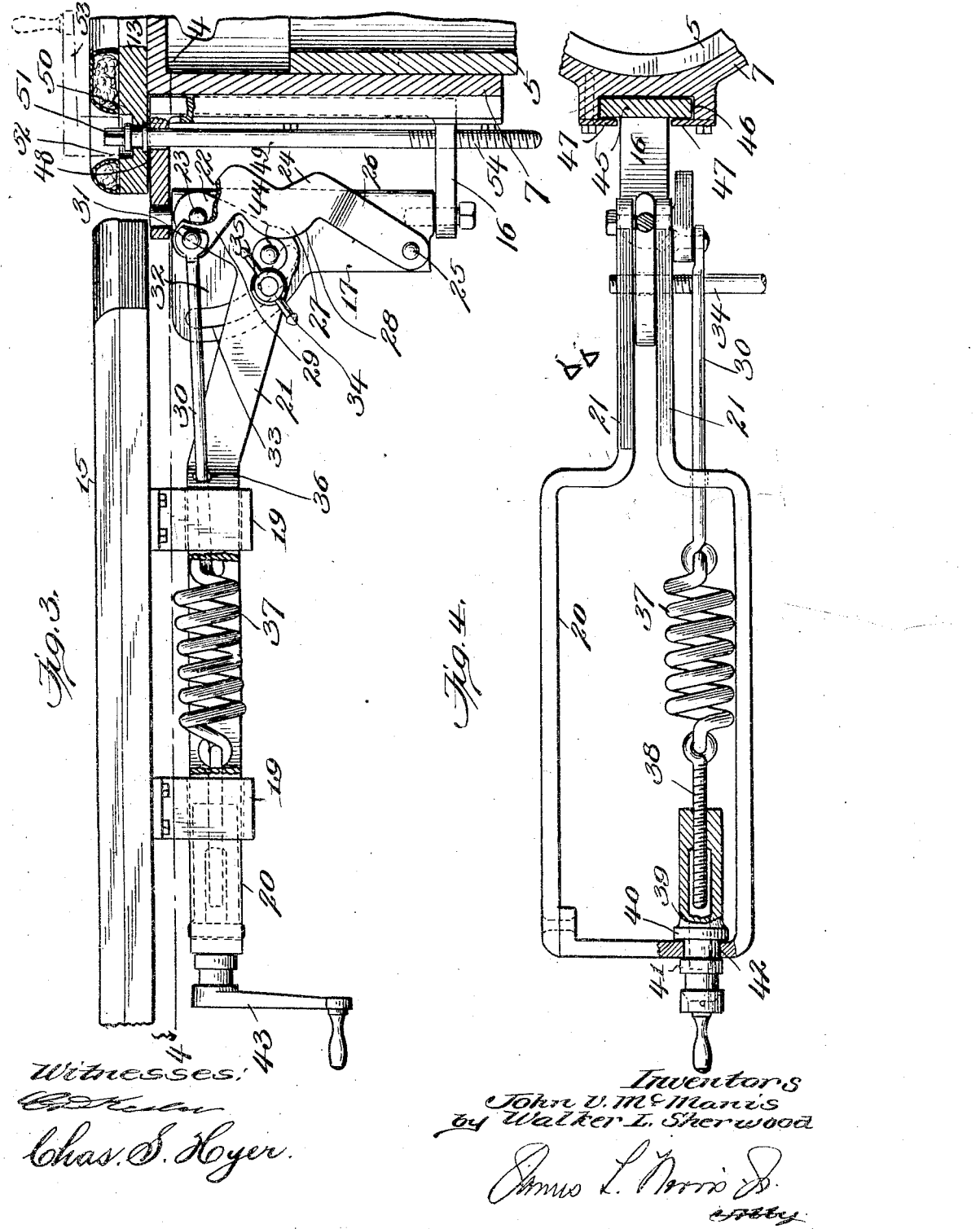

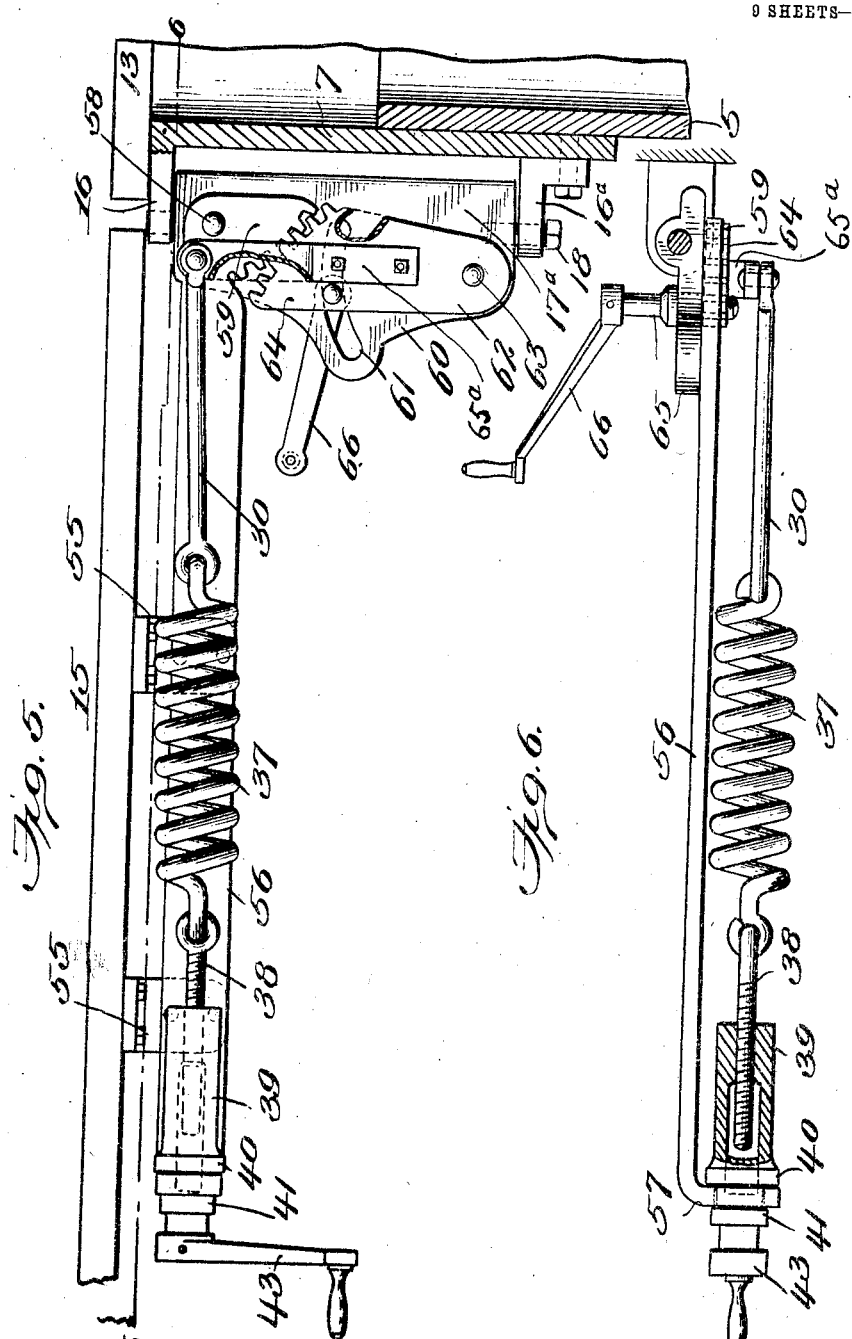

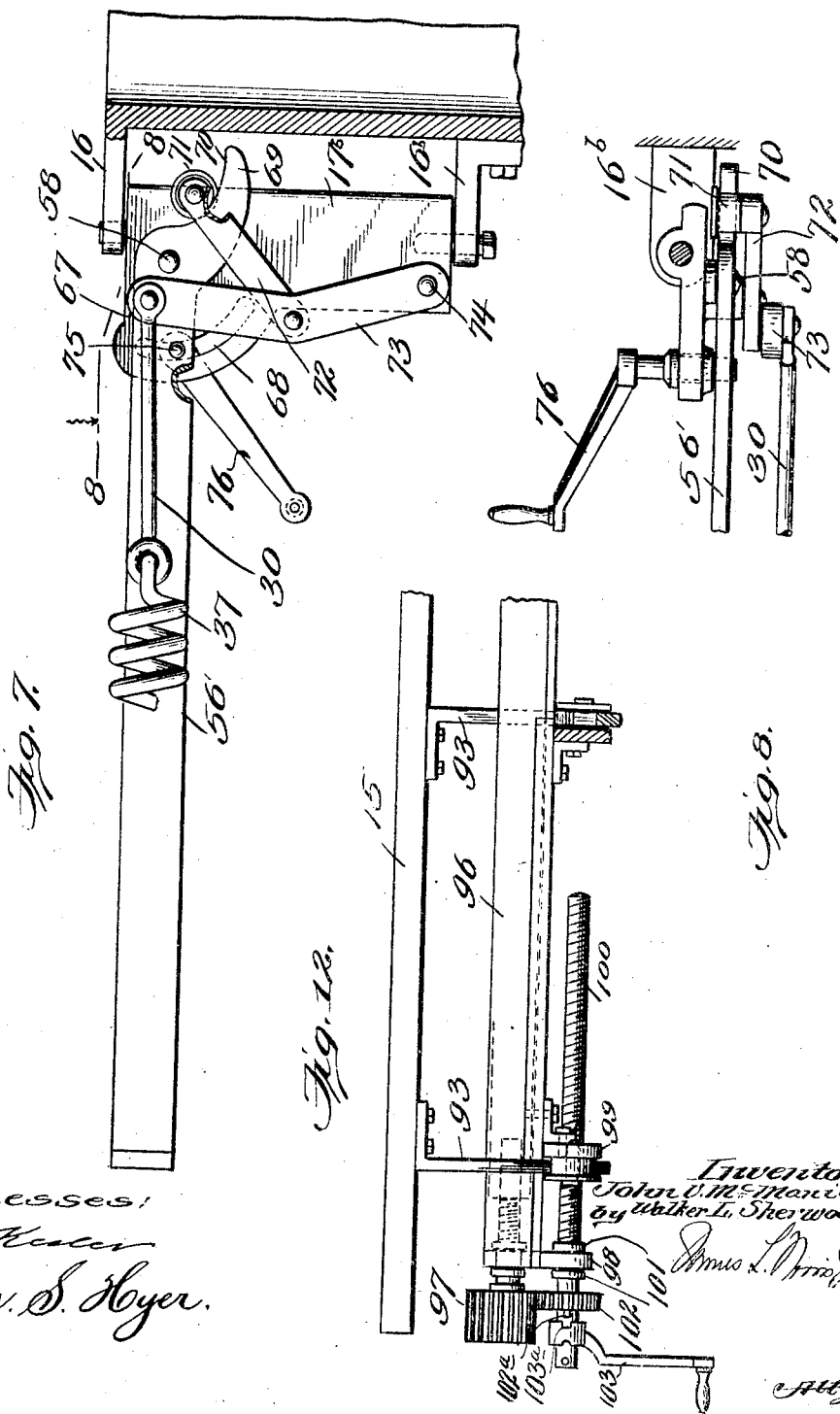

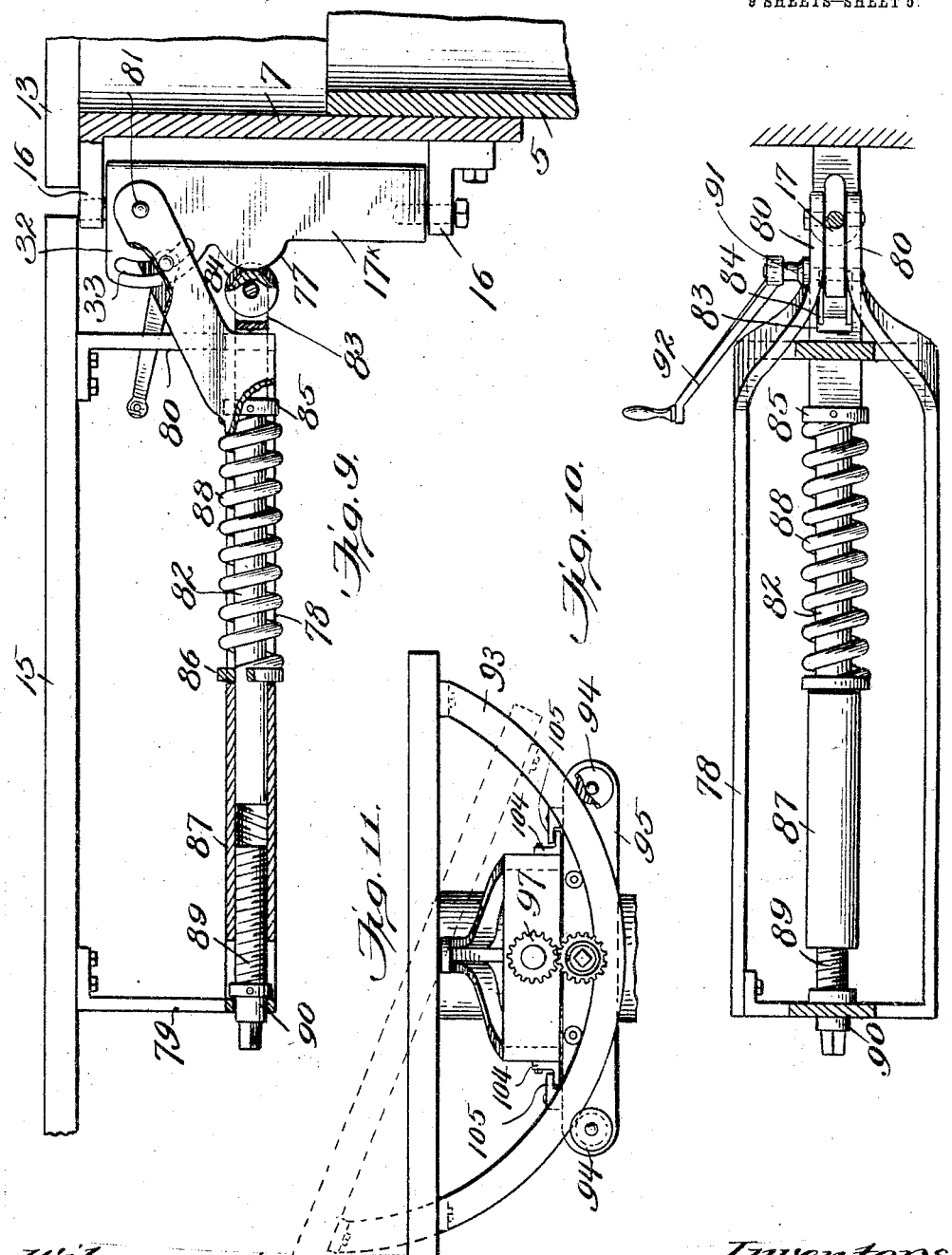

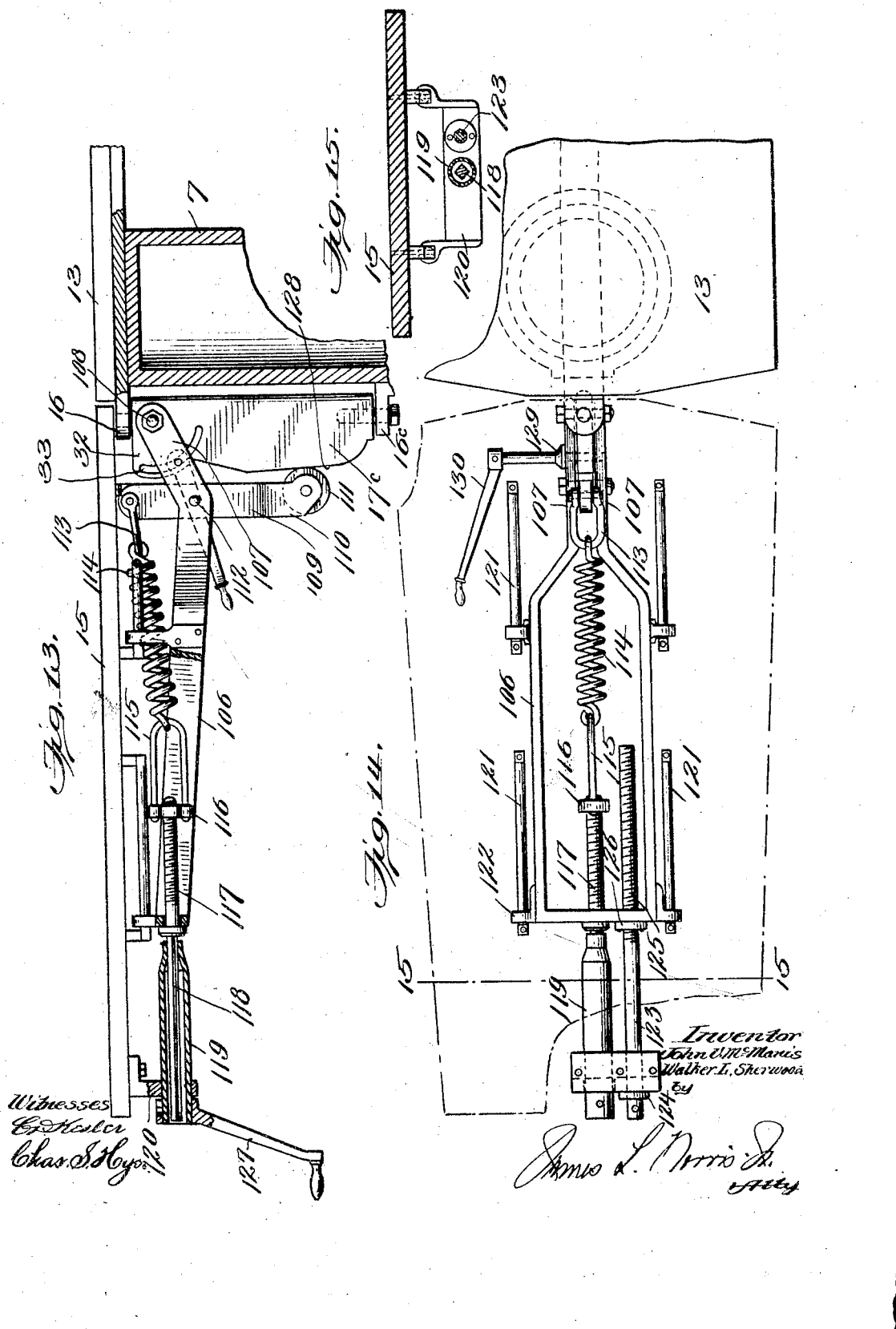

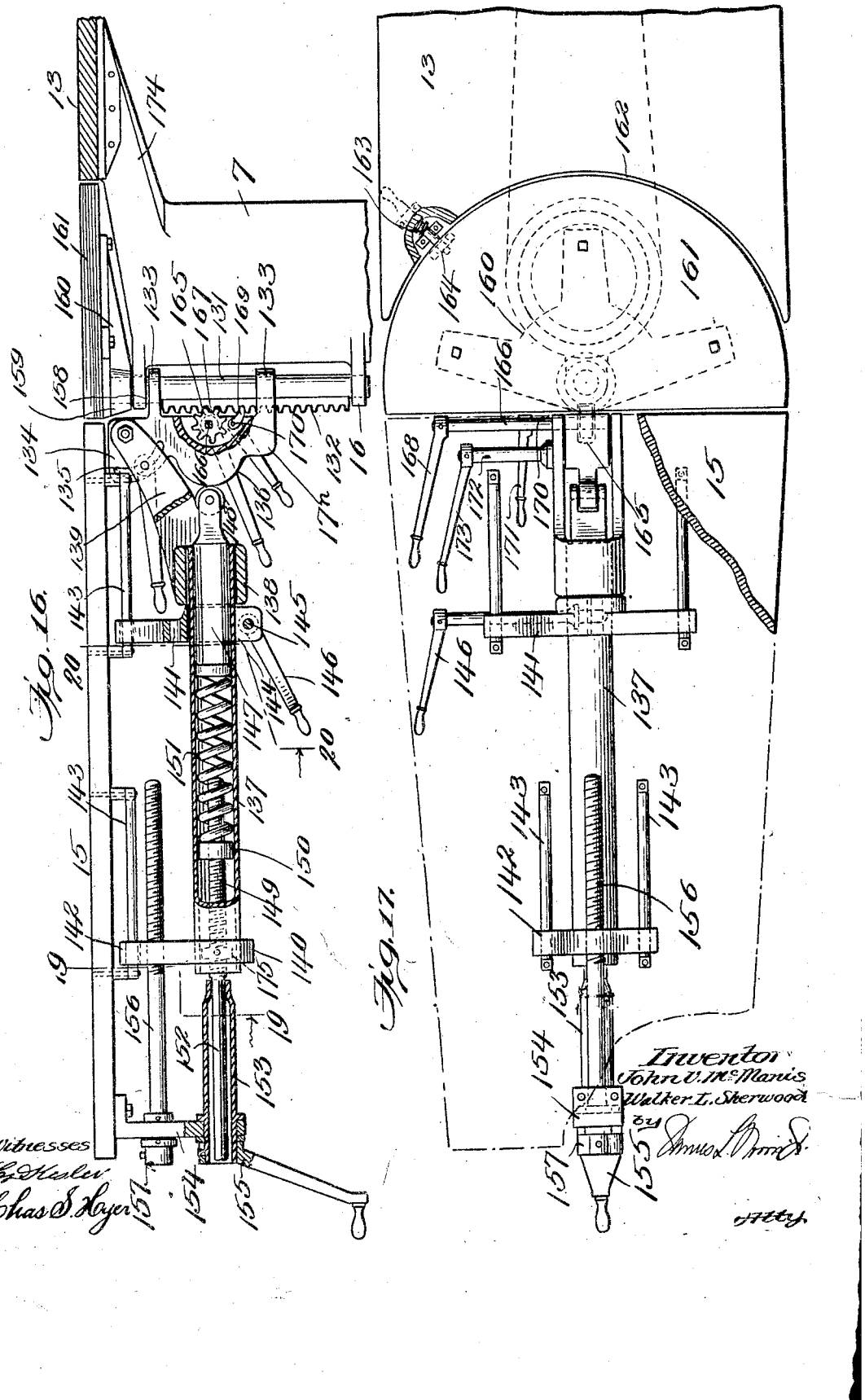

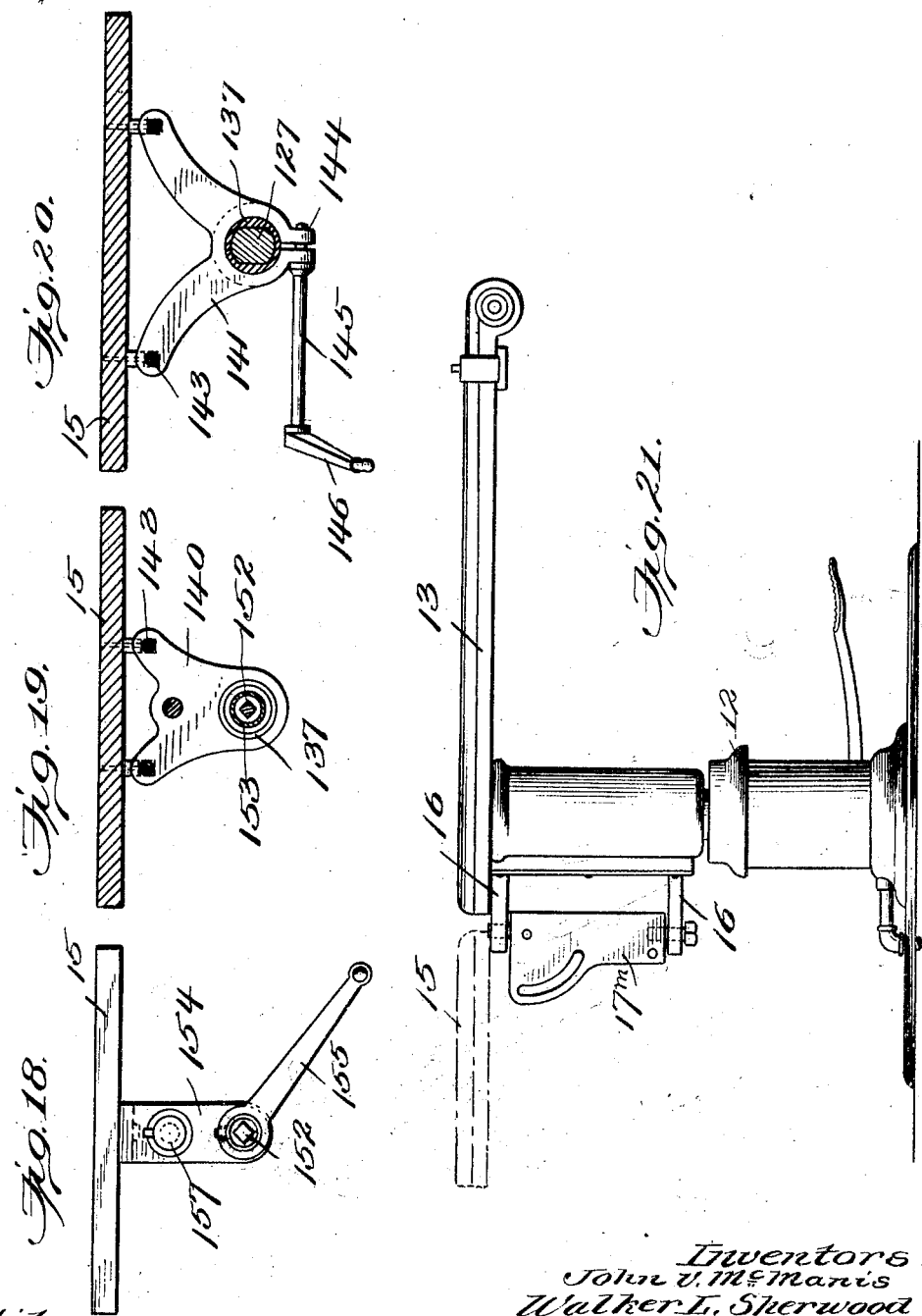

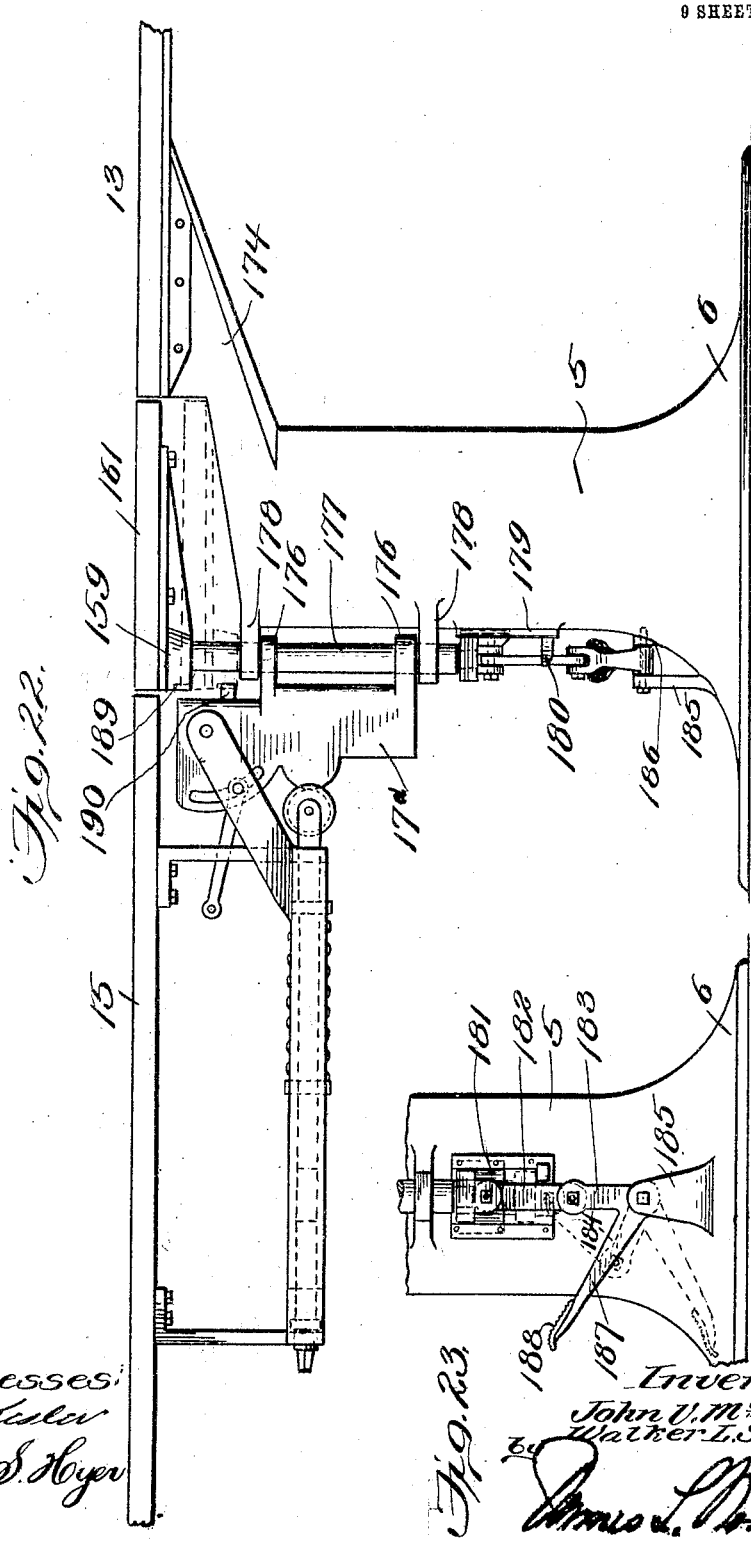

JOHN V. McMANIS, OF BAIRD, TEXAS, AND WALKER L. SHERWOOD, OF KIRKSVILLE, MISSOURI; SAID SHERWOOD ASSIGNOR TO SAID McMANIS.

OSTEOPATHIC TABLE.

1,062,489.

Specification of Letters Patent. Patented May 20, 1913.

Application filed June 17, 1912. Serial No. 704,304.

*To all whom it may concern:*

Be it known that we, JOHN V. McMANIS and WALKER L. SHERWOOD, citizens of the United States, residing at Baird and Kirksville, in the counties of Callahan and Adair and States of Texas and Missouri, respectively, have invented new and useful Improvements in Osteopathic Tables, of which the following is a specification.

This invention relates to tables for use by osteopathic practitioners in treating patients by moving and stretching various parts of the human body.

The primary object of the invention is to provide a table of the class set forth, embodying mechanical structures which permit a multiplicity of adjustments and movements with ease of manipulation and with more effectiveness in correcting and curing physical irregularities of the spine and ribs, and especially the cervical and dorsal vertebræ, as well as ordinary curvatures, sprains, and the like.

The present form of table, in its various modifications, is an improvement on that disclosed in our Patent No. 1,038,619, patented Sept. 17, 1912, and wherein a main table is disclosed having a swinging section held in suspended relation thereto, and capable of lateral movement, as well as vertical adjustment and movement. In the patented structure, the tension on the swinging section increases as it descends, and it is the purpose of the present improvement more particularly to neutralize the increasing tension on the swinging section during descent and to otherwise improve the patented structure and increase the scope and applicability, as well as the effectiveness, of this class of tables used in osteopathic treatments.

The invention consists in the construction and arrangement of the several parts which will be more fully hereinafter described and claimed, and all embodying the same essential feature of the invention.

In the drawings: Figure 1 is a side elevation of one form of the improved osteopathic table shown broken away in part; Fig. 2 is a top plan view of the table as shown by Fig. 1; Fig. 3 is an enlarged sectional side elevation of a portion of the main table and pedestal and the auxiliary section; Fig. 4 is a horizontal section taken in the plane of the line 4—4 of Fig. 3; Fig. 5 is a sectional side elevation of a portion of the main table section and pedestal and the auxiliary swinging section, showing a modification in the construction; Fig. 6 is a horizontal section taken in the plane of the line 6—6 of Fig. 5; Fig. 7 is a sectional side elevation of the pedestal for supporting the main table section and the devices coöperating with the auxiliary swinging section, and illustrating a further modification; Fig. 8 is a detail horizontal section taken in the plane of the line 8—8 of Fig. 7; Fig. 9 is a view similar to Fig. 5, and shown partially in section and illustrating a further modification; Fig. 10 is a sectional plan view of the tension neutralizing means coöperating with the auxiliary table section as shown by Fig. 9; Fig. 11 is an end elevation showing the auxiliary swinging table section and a part of the pedestal and means for swinging the same laterally through the medium of bearing rails or segmental track devices; Fig. 12 is a side elevation, partially in section, of the structure shown by Fig. 11; Figs. 13 and 14 designate respectively a sectional side elevation and a bottom plan view of a further modified form of the table; Fig. 15 is a transverse vertical section on the line 15—15 of Fig. 14; Fig. 16 is a view similar to Fig. 13, broken away and in section, and illustrating a further modification; Fig. 17 is a bottom plan view of the structure shown by Fig. 16; Fig. 18 is an outer end elevation of the auxiliary swinging section as shown by Fig. 16; Fig. 19 is a transverse vertical section taken in the plane of the line 19—19 of Fig. 16; Fig. 20 is a transverse vertical section taken in the plane of the line 20—20 of Fig. 16; Fig. 21 is a detail side elevation showing one form of the table equipped with a hydraulic pedestal which is adapted to be used with all of the forms of the table illustrated; Fig. 22 is a side elevation of a still further modified form of the table, the main table section and the auxiliary section being broken away; and Fig. 23 is a detail elevation at an angle to that shown by Fig. 22 and illustrating a part of the operating mechanism in full and dotted line positions.

The numeral 5 designates a supporting pedestal or pillar having a base 6 and a tubular cap 7 movably fitted thereover to have a vertical elevation by any suitable mechanism, such, for instance, as a rack 8 engaged by a pinion 9 shown in dotted lines, and actuated through the medium of a lever 10, the pinion being carried on a suitable shaft 11 extending transversely through a portion of the cap 7, as shown. Other mechanisms may be adapted for elevating the cap 7, such, for instance, as shown by Fig. 2, wherein a hydraulic pedestal 12 of any suitable form is illustrated, and this hydraulic pedestal may be substituted for those shown in the several forms of the device illustrated by the drawings, the object being to use any preferred means in the form of a pedestal for raising and lowering the frame or bed 13, constituting the main table section and suitably upholstered, as at 14, and having any preferred form of means for adjusting a portion thereof vertically at an angle to the horizontal to dispose the patient in various positions, as clearly disclosed in our patent hereinbefore noted. The main table section 13 is adapted to adjustably support or hold the torso, and coöperating therewith is an auxiliary or swinging table section 15, which will be hereinafter referred to by the same reference character in all the figures, the auxiliary section 15 being also suitably upholstered and both the main table and auxiliary sections will be provided with suitable holding straps, supports, or other attachments that are used in connection with devices of this character for securing the human body in proper position thereon, or to ease the same during particular operations, as may be desired by the operator. Bracket arms 16 extend outwardly from the cap 6 at a point diametrically opposite the position of the shaft 11 and pinion 9, and movably mounted to swing to opposite lateral directions between said bracket arms is a swivel member 17, one of the fulcrums of which is in the form of a movable screw 18 that will facilitate the application and removal of the swivel member relatively to the said bracket arms.

A pair of strap hangers 19 is secured to the under side of the auxiliary table section 15, and support and hold a tension frame 20 of the form illustrated by Fig. 4 and preferably having a rectangular contour with the extremities 21 drawn inwardly in parallel relation to provide connecting arms which extend downwardly, as shown by Figs. 1 and 3 and terminate in short angular arms 22, the arms 21 and 22 practically forming bell crank levers which are fulcrumed to the swivel member 17 by means of a fulcrum pin or rod 23 extending through the upper portion of said member and through the arms 22 adjacent to the upper ends of the latter. A neutralizing bar or member 24 is pivoted or fulcrumed at its lower end to the swivel member 17, as at 25, and comprises an upwardly projecting annular leg 26 continued into an intermediate bearing web or portion 27 formed with an arcuate edge 28, the said web or portion 27 also having an upwardly and outwardly extending angular leg 29, to the free ends of which a tension rod 30 is movably secured by a pivot, as at 31. The upper portion of the swivel member 17 is formed with a segmental extension 32, having therein a segmental slot 33 whose center is the pivot 23 of the upper ends of the short arms 22 of the bell crank levers formed by the combined arms 21 and 22 and continuous with or secured to the tension frame 20. The clamping screw rod 34 extends through the arms 21 adjacent to the elbows or points of intersection of the latter with the arms 22, and also through the segmental slot 33, and is provided with a turn head 35 for locking the arms 21 and 22 in any adjusted position within the range of the segmental slot 33, as may be desired or found necessary during the treatment of the patient. The tension rod 30 loosely projects through an opening 36 in the inner end of the frame 20 at one side of the longitudinal center of the latter, and is loosely connected to one end of a tension spring 37, the opposite end of said spring being movably attached to an adjusting screw rod 38, mounted in a tubular adjusting head 39 which is shouldered as at 40 and 41 and rotatably mounted in an opening 42 in the outer end of the frame 20. The shoulders 40 and 41 prevent the head 39 from shifting longitudinally, as will be readily understood, and the said head is rotated through the medium of a crank handle 43 applied on the outer end thereof, as shown by Figs. 1, 3, and 4. By adjusting the head 39 in opposite directions, the tension of the spring 37 may be decreased or increased, and consequently, the tension on the auxiliary table section 15 will be accordingly modified. The segmental bearing edge 28 of the neutralizing member 24 is continuously held in contact with a roller 44, applied to or carried on the elbow of one of the bell crank levers embodying the short and longer levers 22 and 21, and the rise and fall or the vertical adjustment of the auxiliary section 15 will be rendered regular by the contact of the arcuate and segmental edge 28 with the roller 44, the said roller being continuously held in contact with this edge by the tension of the spring 37 exerted through the tension rod 30 on the upper angular arm 29 of the neutralizing member 24, and as a consequence, the increasing tension of the auxiliary or swinging section 15 during its descent will be neutralized with material advantage in the operation of said table section.

It will be understood that the auxiliary section 15 may be adjusted at any angle above or below a horizontal plane and its adjustment fixed through the medium of the clamping rod 34, and subsequent movement of the table will be permitted in a downward direction, for instance, by the weight of the lower portion of the body of the patient thereon, owing to the spring 37 and rod 30 connected to the neutralizing member 24. It will also be seen that the auxiliary section 15 may be swung laterally through the medium of the swivel member 17, and in view of this range of movement, various treatments of the human body may be readily accomplished.

The bracket arms 16 project outwardly from the upper and lower extremities of a vertically disposed slide bar or adjusting member 45, held in a channel 46 of the cap 7 by retention plates 47 secured at intervals on the cap and along the opposite side walls of the channel, as clearly shown by Fig. 4, the said retention plates being of sufficient width to extend over the opposite side edges of the bar 45. Loosely extending through an opening 48 in the upper bracket arm 16 is an adjusting rod 49, which is shouldered or swiveled in the inner end of the main table section 13 as at 50 and has an upper squared head 51 exposed through an opening 52 in the said main table section and the upholstery of the latter for engagement by a crank handle 53, the lower extremity of said rod 49 being screw threaded as at 54 to adjustably engage the lower bracket arm 16. By operating the rod 49 through the medium of the crank handle 53, the bar 45 carrying the arms 16, together with the swivel member 17, bell crank levers comprising the short and longer levers 22 and 21, and the neutralizing member 24, may be vertically adjusted relatively to the main table section, and with these parts the auxiliary table section 15 is likewise adjusted so that its elevation may be modified as desired. The purpose of this vertical adjustment of the auxiliary table section and the parts carried thereby is to accommodate certain treatments or to place the body of the patient in such position that a stretching action or tension relatively to some physical member or constituent may be more effectively treated and the irregularity thereof positively rectified.

In the form of the table shown by Figs. 5 and 6, the pedestal comprising the part 5 and cap 6, the main table section 13, the auxiliary table section 15, brackets 16ª, swivel member 17ª, tension rod 30, tension spring 37, adjusting screw rod 38, adjusting head 39 for said rod, and the crank 43, are all similar to the parts bearing like reference characters in Figs. 1, 2, 3 and 4, and perform the same relative functions. The brackets 16 are not vertically adjustable in this instance and consequently the rod 49 and coöperating adjusting features are omitted. Hangers 55 depend from the auxiliary table section 15 and have a different form of tension frame 56 secured thereto, said frame consisting of a single bar with an outer angular end 57 for supporting the adjusting head 39. The inner extremity of the frame 56 extends over one side of the swivel member 17ª and is fulcrumed at 58 to said member, the inner end of the frame being in the form of a depending toothed segment 59. The outer portion of the swivel member 17ª is formed with an extension 60 having a segmental slot 61 therein and continuing inwardly throughout a portion of the width of the swivel member. The lower end of a neutralizing member 62 is pivoted to the lower end of the extension 60, the pivot 63 of the neutralizing member 62 being the center from which the segmental slot 61 is described. The upper end of the neutralizing member 62 is constructed as a segmental toothed head 64 which is in continual mesh with the depending toothed segment 59, and to the said member an upstanding bracket arm 65ª is fixed and has the inner end of the tension rod 30 movably attached to the upper end thereof, so that the tension of the spring 37 is transmitted through the neutralizing member 62 by means of the toothed segment 59 and frame 56 to the auxiliary table section 15, and to maintain the neutralizing member 62 in fixed adjusted position, a shouldered clamping screw-rod 65 coöperates with the extension 60 and extends through the segmental slot 61 and into the neutralizing member 62, as shown, the said clamping screw-rod being operated by a crank handle 66.

In the table shown by Figs. 7 and 8, only the neutralizing devices are illustrated and a portion of the tension spring and pedestal. As shown by Fig. 7, the brackets 16ᵇ pivotally support the swivel member 17ᵇ therebetween, and said member has an upper extension 67 at its outer portion provided with an upwardly directed segmental slot 68 and the inner end of the tension frame 56 in this instance is pivoted as at 58 to the upper portion of one side of the swivel member 17ᵇ, as in Fig. 5, but terminates in a projection 69 having an upper concaved edge 70 continually engaged by a roller 71 movably carried by the upper end of an arm 72 pivoted to the intermediate portion of a neutralizing member 73 which in this instance has its lower end pivoted to the swivel member 17ᵇ, as at 74, and to the upper end thereof the tension rod 30 of the tension spring 37 is movably connected. The neutralizing member 73 is intermediately deflected as shown, and to this intermediate deflection the arm 72 is movably secured and by this means the neutralizing member of this particular form is rendered more effective in performing the function desired. The roller 71 is flanged in order to retain it in reliable association with the concaved edge 70 of the projection 69. In this particular form of the neutralizing mechanism the inner extremity of the frame 56 is held against movement when adjustment has been acquired by a clamping screw rod 75 extending through the segmental slot 68 and engaging the inner extremity of the frame 56 and having an operating crank handle 76 applied thereto, said clamping screw rod and crank handle being similar to like devices heretofore described.

In the construction shown by Figs. 9 and 10, the swivel member 17$^k$ is mounted between the brackets 16 in the same manner as the devices heretofore described of a similar character, and like the construction shown in Figs. 1 and 2 has an upper extension 32 with a segmental slot 33 therein, but instead of the segmental or arcuate bearing edge being formed as a part of the neutralizing member, the said swivel member has its outer portion formed with an intermediate segmental or arcuate bearing edge 77. In the construction shown by Figs. 9 and 10 the tension frame 78 is similar to that shown by Fig. 1, and is held by hangers 79 in depending relation to the under side of the auxiliary table section 15, the inner extremities of the tension frame 78 being converged and terminating in upwardly extending parallel arms 80 which movably embrace the extension 32 and are fulcrumed as at 81 to the swivel member 17$^k$ at a distance inwardly from the segmental slot 33. In this instance an elongated tension rod 82 is provided and has an inner bifurcated end 83 carrying a flanged roller 84 continually held in engagement with the segmental or arcuate bearing edge 77 of the swivel member 17$^k$. The rod 82 has a collar 85 fixed thereon and at a suitable distance therefrom is a second collar 86 through which the rod loosely extends into an adjusting tube or head 87. Between the collars 85 and 86 a tension spring 88 is mounted and operates to continually hold the roller 84 in engagement with the segmental or arcuate bearing edge 77 as well as governing the spring action or tension of the auxiliary table section as a whole. The adjusting tube or head 87 is engaged by an adjusting screw-rod 89 extending into the outer end thereof and having a shouldered bearing head 90 rotatably mounted in the outer hanger 79 and adapted to be engaged and operated by a suitable crank handle. It will be understood that the screw-rod 89 is adjusted to regulate the tension of the spring 88. To retain the adjustment of the auxiliary table section 15 as may be desired, a clamping screw-rod 91 engages the arms 80 and extends through the segmental slot 33, said clamping screw-rod 91 being operated by a crank handle 92.

Figs. 11 and 12 illustrate means by which a rocking or torsional movement of the auxiliary table section 15 is obtained, only so much of the auxiliary table section being shown as to practically illustrate the rocking feature, and it will be understood that this rocking or torsional movement or the mechanism by which the same is accomplished is adapted to be used with any of the forms of table heretofore described and which will be hereinafter explained. Furthermore, the same neutralizing bar or member organization heretofore described will be used with the auxiliary table section embodying the torsional or rocking mechanism. The auxiliary table section 15 in this instance has segmental or arcuate hangers 93 depending therefrom and forming tracks which engage inner and outer pairs of flanged rollers 94 mounted on the opposite ends of transverse arms or bars 95 secured to and depending from the tension frame 96, the said bars or arms 95, as shown by Fig. 11, extending a considerable distance outwardly beyond the opposite sides of the tension frame. This tension frame is practically of the same form as the frame 78 shown by Fig. 10, and the tension devices will be of similar construction, the outer end of the adjusting rod 89 being provided with a pinion 97. In suitable hangers 98 and 99 depending from the frame 96 is a traction adjusting screw 100, the hanger 99 being screw-threaded and the rod 100 running free in the hanger 98 and held against movement by collars 101 disposed adjacent to the inner and outer sides of the said hanger 98. A pinion 102 is loose on the screw-rod 100 and held in mesh with the pinion 97, and to operate the rod 100 a crank handle 103 is mounted on the outer end thereof. The crank handle 103 is slidable on the rod 100 and has a notch 103$^a$ to engage a projection 102$^a$ on the pinion 102 to rotate the latter and adjust the tension spring through the pinion 97. The opposite sides of the frame 96 have angle slides 104 secured thereto and longitudinally movable under guides 105, and by this means the frame 96 may be longitudinally moved away from and toward the main table section by operating the rod 100, and the tension spring adjusted by operating the same rod. When the auxiliary table section is moved longitudinally the rollers 94 are moved relatively therewith.

Figs. 13, 14 and 15 illustrate further modifications, and therein parts similar to those heretofore described are indicated by the same reference characters. In this instance the swivel member 17$^c$ is held between the brackets 16$^c$ associated with the cap 7, and the said swivel member is formed with an upper extension 32, as in Fig. 9, with a segmental slot 33 in said extension. The tension frame 106, which is similar to the frame 78, is inclined downwardly from its outer end toward the swivel member and has a pair of upwardly extending arms 107 at its inner extremity movably embracing the extension 32 and unitedly pivoted to the swivel member 17ᶜ in rear of the segmental slot 33, as at 108. The neutralizing member 109 in this particular structure is vertically disposed and consists of a flat bar having a lower bifurcated or forked end 110 in which a roller 111 is mounted, the said neutralizing member 109 being intermediately fulcrumed between the arms 107, as at 112, and to the upper end thereof a tension link 113 is secured by a suitable pivot means and has the inner end of a tension spring attached thereto. The outer end of the spring 114 is attached to the bend of a stirrup 115, the opposite head end 116 of said stirrup being engaged by an adjusting screw-rod 117 rotatably mounted at an intermediate point in the outer end of the frame 106 and having an angular shank 118 extending outwardly therefrom a suitable distance and inclosed by an elongated sleeve or tube 119 rotatably mounted in a hanger 120 depending from the outer end of the auxiliary table section 15. The auxiliary table section 15 has inner and outer pairs of track rods 121 depending from the under side thereof and engaged by slide eyes 122 secured to the opposite sides of the frame 106, and by this means the auxiliary table section 15 may be moved outwardly and inwardly relatively to the main table section 13 to set up a stretching operation relatively to the patient operated upon or if found necessary the table may be preliminarily lengthened or shortened, as the case may be, to accommodate different patients and to enable an operator to pursue various treatments. This adjustment of the table section 15 is accomplished through the medium of a traction screw-rod 123 extending through the hanger 120 and having a shoulder or collar 124 bearing against said hanger and also provided with a screw-threaded portion 125 engaging a screw-seat 126 in the outer end of the frame 106. The sleeve 119 and the rod 123 are adapted to be operated by suitable crank handle devices, as 127, and it will be understood that the said adjusting devices may both be operated by a single crank handle or by independent crank handles. The neutralizing member 109 performs the same function in this modified structure as in the preceding organizations and the roller 111 thereof is held in continual engagement with an upwardly and outwardly inclined edge 128 of the swivel member 17ᶜ, as clearly shown by Fig. 13, and whereby the same neutralizing effect will be obtained as in the preceding structures.

The frame 106 may be adjusted and fixed in its adjusted position by means of a clamping screw-rod 129 engaging the arms 107 and passing through the segmental slot 33, the said clamping screw-rod being provided with a crank handle 130 for tightening and releasing the same.

In Figs. 16, 17, 18, 19 and 20 a further modification of the table is illustrated, wherein is embodied a semicircular leaf capable of vertical adjustment independently of the auxiliary section and the main table section and whereby the distress and discomfort of the patient are materially lessened in swinging the auxiliary table section, particularly when the chest wall and the upper part of the abdomen rest on the auxiliary section and main table section respectively, the vertical adjustment of the semicircular leaf attachment making it unnecessary to use a pillow or cushion to ease the patient during the adjustment or movement of the auxiliary section. Aside from the semicircular leaf as particularly shown by Figs. 16 and 17, the structure in this form of the table is practically the same as that shown by Figs. 9, 10, 13 and 14, combining parts of the two tables as shown in the latter figures. The cap 7 in the present instance has the main table section 13 secured thereon and carries the brackets 16 as in the preceding figures. A post 131 is rotatably mounted in the brackets 16 and has a rack 132 on its outer portion. The swivel member 17ᵃ engages the post 131 through the medium of two apertured arms 133, the said swivel member having an upper extension 134 provided with a segmental slot 135, and below the extension a segmental or arcuate track edge 136 is formed similar to the structure illustrated by Fig. 9. The tension frame in this instance embodies a tube 137 having a tubular head 138 secured over its inner end and from which upwardly projects a pair of arms 139 constituting the neutralizing member and fulcrumed on the extension 134 of the swivel member 17ᵃ at a distance inwardly from the segmental slot 135. The tube 137 is mounted in hangers 140 and 141 having upper terminals 142 slidably engaging inner and outer pairs of track rods or tracks 143 secured to and located a slight distance below the under side of the auxiliary table section 15. The hanger 141 embodies a clamping head 144 engaged by a clamping rod 145 and an operating lever 146 for the purpose of tightening the said head on the tube and fixing the auxiliary table section 15 thereto to provide for a positive adjustment thereof. It will be understood that the table section 15 may be swung or rocked on the tube 137 when the head 144 is released without interfering with the position and function of the parts carried by said tube. Mounted within the inner end of the tube 137 is a plunger 147 carrying a roller 148 at its inner end which is held in contact with the segmental or arcuate edge 136 of the swivel member 17ª. An adjusting screw-rod 149 carrying a collar 150 is mounted in the outer end of the tube 137, and between the said collar and the outer end of the plunger 147 a tension spring 151 is disposed in the tube. The adjusting rod 149 continues outwardly beyond the outer end of the tube 137 in the form of an elongated stem or shank 152 which is angular in cross-section and is covered by a sleeve 153 having rotatable bearing in a hanger 154 depending from the outer end of the table section 15 and engaged by a crank handle 155 similar to the construction shown by Figs. 13 and 14. A traction screw-rod or adjusting device 156 engages the hanger 154 and the hanger 140 above the plane of the tube 137, and the crank handle 155 may be applied to the outer or head end 157 of this traction rod. The object of this traction rod is to shift the auxiliary table section inwardly and outwardly with relation to the main table, the connected relation of the auxiliary table section and the tension devices just explained being maintained through the track-rods 143 and the hangers 140 and 141. The rack 132 is vertically movable in the post 131 or forms part of a post disposed in sliding relation to the said post 131 and extends above the latter as at 158 and secured in a socket 159 of a spider 160 fixed to the under side of a semicircular leaf 161 which is freely movable over the upper extremity of the cap 7. The inner extremity of the main table section 13 is formed with a semicircular recess 162 to receive a portion of the semicircular leaf 161, and as hereinbefore indicated, the semicircular leaf 161 may be moved or shifted in a horizontal plane on the upper end of the post embodying the rack 132. To hold the semicircular leaf 161 in normal position against swinging movement on its axis as well as vertical elevation, a spring-actuated catch bolt 163 is provided and carried by the main table section 13 and is adapted to engage a socket 164 in the said leaf or secured to the latter, as clearly shown by Fig. 17. The rack 132 and its post are adapted to be rotated with the post 131 when the auxiliary table section 15 is swung in opposite lateral directions so as to maintain the operative mechanism for the rack in engagement therewith. A recess 165 is formed in the inner edge of the swivel member 17ª, and extending therethrough is a short shaft 166 having a pinion 167 keyed thereon and meshing with the rack 132, the shaft 166 being extended outwardly at one side of the swivel member 17ª, as shown by Fig. 17, and provided with an operating crank 168. Below the pinion 167 a pawl or dog 169 is mounted in the recess 165 on a shaft 170 to engage the teeth of the rack and hold the latter against movement after it has been adjusted. The shaft 170 is also continued outwardly beyond one side of the swivel member 17ⁿ and provided with an operating crank handle 171 whereby the dog may be released from the teeth of the rack 132. The pinion 167 and its shaft 166 are unitedly operated to raise and lower the rack 132 and the post of the latter as well as the semicircular leaf 161, and as the said rack and its post are elevated the dog 169 catches in the successive teeth of the rack to prevent the latter from falling. When it is desired to lower the rack 132 together with its post and the semicircular leaf 161, the dog 169 is released from the teeth of the rack by operating the shaft 170 through the medium of the crank handle 171. As in the previous structures, the auxiliary table section 15 may be held in fixed adjusted position by means of a clamping screw rod 172 extending through the arms 139 and the segmental slot 135, the said adjusting screw or clamping rod 172 being provided with an operating crank handle 173. It will also be seen that the main table section 13 is connected to the cap 7 in this instance by an arm 174 extending from the top of said cap and secured to the under side of the main table section 13 so as to give a clearance for the operation of the semicircular leaf 161 over the pedestal structure in the arcuate recess 162 at the inner end of the main table section 13 and between the latter section and the inner end of the auxiliary section 15. The plunger 147 has the cross-sectional contour illustrated by Fig. 20 to engage the similar contour of the inner wall of the tube 137 to prevent said plunger from turning and thereby always hold the roller 148 in upright or vertical position, as shown by Fig. 16. The outer end of the tube 137 is suitably plugged, and a collar 175 engaging the screw-rod 149 has bearing against the said plug to facilitate the operation of the said adjusting screw-rod 149.

In the construction shown by Fig. 21 embodying the hydraulic pedestal 12, hereinbefore referred to, the swivel member 17ᵐ and coöperating parts including the tension spring and frame will be similar to that shown by Fig. 9, though it will be understood that this hydraulic pedestal may be equally well applied to any one of the forms of table hereinbefore disclosed.

The still further modified form of table illustrated by Figs. 22 and 23 embodies the semicircular leaf 161 with the remaining mechanism coöperating with the auxiliary table section 15, as shown by Figs. 9 and 10, with the exception that the swivel member 17ᵈ has a different mounting, and, furthermore, the semicircular leaf 161 is elevated and depressed by mechanism materially differing from that disclosed by Figs. 16 and 17. The same reference characters are used on Fig. 22 to indicate parts similar to those illustrated by Figs. 9 and 10, and the construction and operation of these parts are like those explained in connection with said latter figures. The swivel member 17ᵈ in this instance has inwardly projecting apertured lugs or ears 176 loosely and rotatably engaging a post 177 disposed vertically and slidable in arms 178 extending outwardly from the pedestal 5, the upper end of the post engaging the socket 159 of the semicircular leaf 161. Secured on the pedestal 5 below the lower arm 178 is a guide plate 179 having an outwardly projecting stop 180 at one side of the lower extremity thereof. A slide 181 is mounted in the guide plate 179 and has the lower end of the post 177 attached to the upper portion thereof, and to the lower part of the said slide a link 182 is movably attached and also pivotally connected to the shorter arm 183 of a bell-crank tread lever 184 fulcrumed at its elbow between upwardly projecting lugs 185 and 186 forming part of or secured to the base 6 of the pedestal. The longer arm 187 of the bell-crank tread lever has a roughened tread plate 188 on its outer free end, and in operation the longer arm 187 of the lever 184 is depressed, as shown by dotted lines in Fig. 23, to lower the semicircular leaf 161 below the plane of the main and auxiliary table sections 13 and 15, the lowering operation being limited by a portion of the slide 181 striking the stop 180. It will be seen that by throwing the bell-crank tread lever 184 upwardly, the semicircular leaf 161 may be restored to normal position and the intermediate portion of the body of the patient treated, as hereinbefore explained, may be cleared with advantages in the comfort and ease of the patient treated. The terminal of the socket 159 adjacent to the auxiliary section 15 is formed with a downwardly opening slot 189 which is adapted to be engaged by a lug 190 projecting from the upper inner portion of the swivel member 17ᵈ when the semicircular section 161 is depressed so that said semicircular section will be caused to move or swing uniformly with the auxiliary section 15.

From the foregoing it will be seen that both compression and expansion springs are employed as the primary tension means relatively to the auxiliary table section 15, and, furthermore, the neutralizing member or means may be in the form of a bar or movable part interposed between and coöperating with the swivel member and the tension frame, or in some instances the said neutralizing means may be a part of the tension frame, particularly in the tables shown by Figs. 9, 10, 13, 14, 16, 17 and 22. As an instance of the employment of a compression spring, attention is called to the structure illustrated by Figs. 9, 10, 16 and 17, the remaining resilient tension devices being in the form of expansion springs. It will also be understood that the several tables hereinbefore described have been devised to meet various contingencies in osteopathic treatments with greater ease to the patient, and as the most essential feature the tables embody means for neutralizing the increasing tension of the spring devices when the auxiliary sections are depressed, the rollers engaging the different portions of the swivel members and inner extremities of the tension frames constituting shiftable fulcrums for facilitating the movement of the auxiliary table sections.

What is claimed is:

1. In an osteopathic table, a main table section, an auxiliary table section resiliently suspended in relation to the main table section and also laterally movable, and means for neutralizing the increased tension of the resilient means due to the depression of the auxiliary section.

2. In an osteopathic table, a main table section, an auxiliary table section suspended from said main table section and free to be moved in opposite lateral and vertical directions, spring tension means coöperating with the auxiliary table section, and neutralizing means for the increased tension of the spring means arising from the descent of the auxiliary table section.

3. In an osteopathic table, a main table section, an auxiliary table section suspended in relation thereto and having adjustable resilient tension means to regulate the said auxiliary table section in accordance with varying weight pressures imposed thereon, the said auxiliary table section automatically returning to its normal adjusted position when released, and an equalizing means associated with the auxiliary section and resilient tension means.

4. An osteopathic table comprising a main table section having a swinging auxiliary table section suspended in relation thereto, the auxiliary section automatically assuming a normal position when released, and means for neutralizing the increased tension exerted on the auxiliary section when the latter is depressed.

5. In an osteopathic table, a swinging auxiliary table section having resilient tension means coöperating therewith, the auxiliary section automatically returning to a normal position when released, and means for neutralizing and equalizing the resilient tension on the auxiliary section during movement of the latter.

6. In an osteopathic table, a main table section having a pedestal, a swivel member associated with the pedestal and main table section, an auxiliary table section operatively connected to the swivel member, spring tension means coacting with the auxiliary table section and the swivel member, and neutralizing means coacting with the spring tension means to relieve the auxiliary section of increased tension when depressed.

7. In an osteopathic table, the combination of a main table section, and an auxiliary table section suspended in relation to said main table section and adapted to have a rocking movement in opposite lateral directions imparted thereto.

8. In an osteopathic table, the combination of a main table section, an auxiliary table section suspended in relation to the main table section, and means coöperating with the main table section for permitting a lateral swinging and rocking movement thereof.

9. In an osteopathic table, the combination of a main table section, an auxiliary table section suspended in relation to the main table section, curved track bars depending from the auxiliary table section, a tension frame having tension devices coöperating with the said auxiliary section, and rollers carried by the tension frame and engaged by the said track bars.

10. In an osteopathic table, the combination with a main table section, of an auxiliary table section held in suspended relation to the main table section, means for permitting a lateral swinging and rising and falling movements of the auxiliary section, means for adjusting the auxiliary section to extend the latter away from or move it toward the main table section, and an equalizing means associated with the auxiliary section.

In testimony whereof we have hereunto set our hands in presence of two subscribing witnesses.

JOHN V. McMANIS.
WALKER L. SHERWOOD.

Witnesses to the signature of J. V. McManis:
L. L. BLACKBURN,
T. C. BELL.

Witnesses to the signature of Walker L. Sherwood:
HOWARD S. DEAN,
FRED J. SHARP.